United States Patent [19]

Amano

[11] 3,930,687
[45] Jan. 6, 1976

[54] SIGNAL GENERATING CIRCUIT FOR ANTI-SKID BRAKE CONTROL APPARATUS

[75] Inventor: Hiroyuki Amano, Chiryu, Japan

[73] Assignee: Aisin Seiki Kabushiki Kaisha, Kariya, Japan

[22] Filed: July 22, 1974

[21] Appl. No.: 490,922

[30] Foreign Application Priority Data
July 28, 1973  Japan.............................. 48-85237

[52] U.S. Cl.......... 303/21 AF; 340/52 B; 340/248 A
[51] Int. Cl.² ............................................ B60T 8/00
[58] Field of Search ........ 303/20, 21 AF; 307/10 R, 307/231, 92, 44; 317/6 DA; 324/51; 340/52 B, 248 R, 248 A–248 C, 253 B

[56] References Cited
UNITED STATES PATENTS

| | | | |
|---|---|---|---|
| 3,768,873 | 10/1973 | Hirzel | 303/20 X |
| 3,825,307 | 7/1974 | Carr et al. | 303/21 AF |
| 3,841,712 | 10/1974 | Syria | 303/21 AF |

*Primary Examiner*—Trygve M. Blix
*Assistant Examiner*—Stephen G. Kunin
*Attorney, Agent, or Firm*—Pierce, Scheffler & Parker

[57] ABSTRACT

A signal generating circuit for anti-skid brake system includes at least a pair of first and second wheels, and a pair of first and second sensing coils for sensing rotational conditions of the first and second wheels, respectively, and generating first and second signals in response thereto, wherein upon troubled conditions occurring in either one of the first and second sensing coils, the signal of the other one of the first and second sensing coils is substituted for the signal of the troubled sensing coil in order to maintain anti-skid brake operation even when one of the sensing coils is faulty.

7 Claims, 2 Drawing Figures

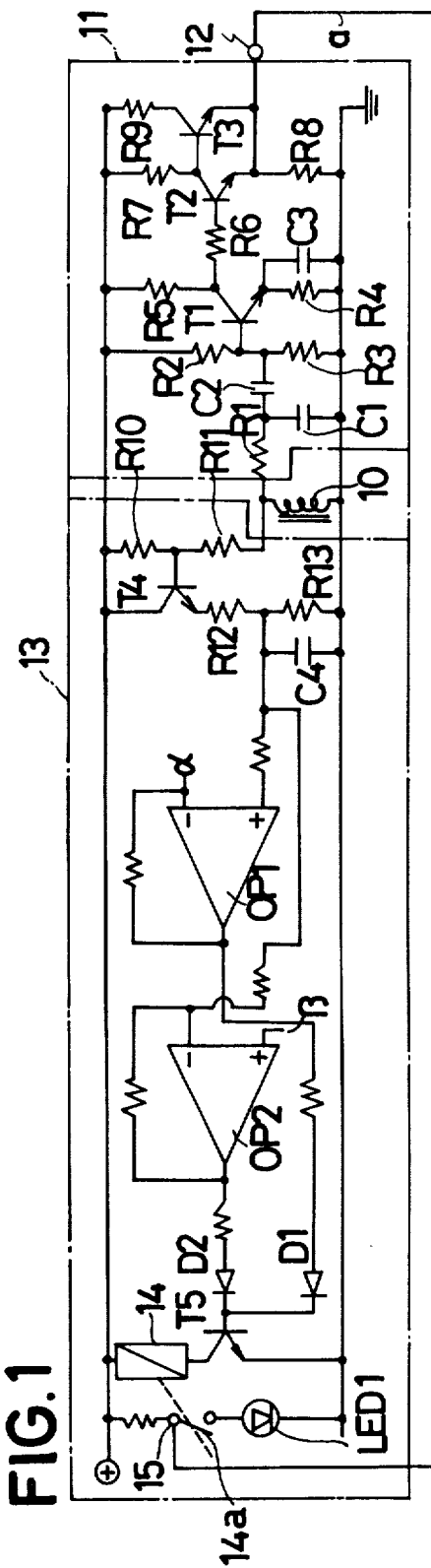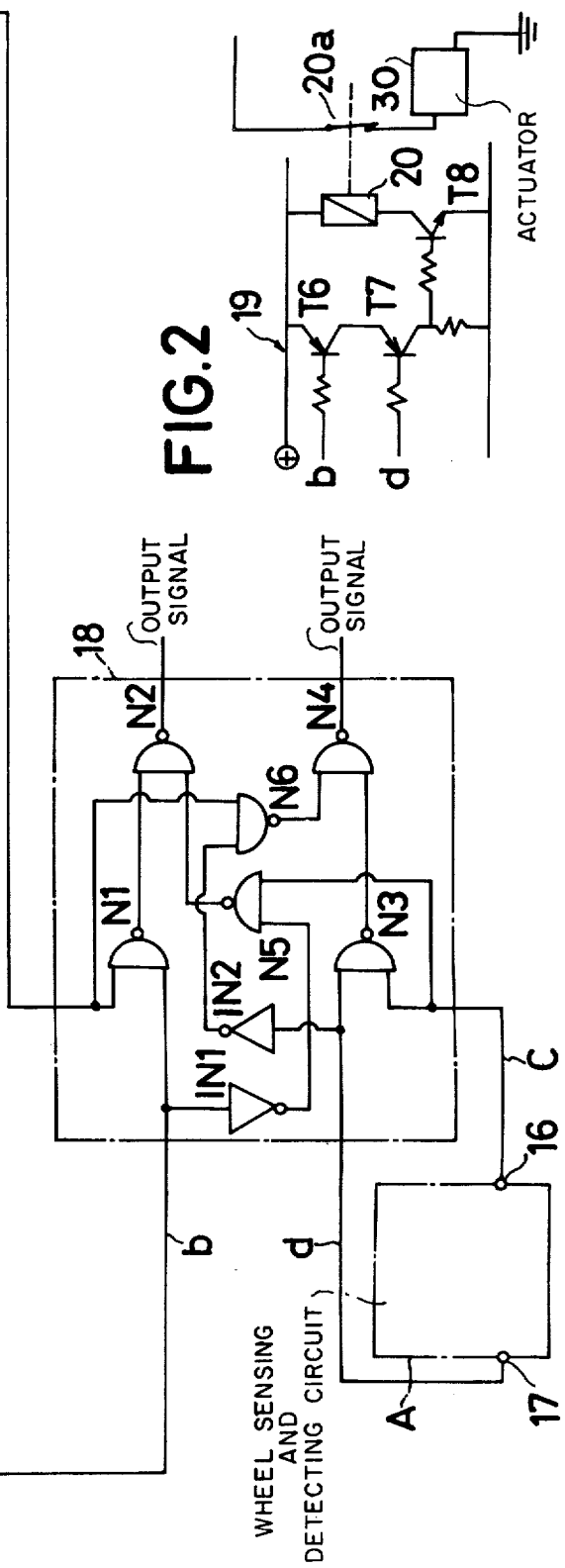

3,930,687

SIGNAL GENERATING CIRCUIT FOR ANTI-SKID BRAKE CONTROL APPARATUS

BACKGROUND OF THE INVENTION

1. Field of the Invention

This invention relates generally to an anti-skid brake controlling apparatus for wheeled vehicles, and more particularly to a signal generating circuit for actuating anti-skid brake actuator means.

2. Description of Prior Art

In the conventional anti-skid brake system, when a sensing means breaks down under anti-skid brake operation, the anti-skid brake system will then devolve into a non-actuated condition, which might often lead to a non-braked condition of the corresponding wheel of the vehicle.

To obviate the above drawback, there has been provided a safety device in the anti-skid brake system, wherein when a sensing means breaks down under anti-skid brake operation, the safety device will then be actuated to change the anti-skid brake operation into a non anti-skid brake operation so that at least a non-braked condition of the wheel may be prevented.

However, in the latter system, the desired anti-skid brake operation for one wheel will not be obtained when the corresponding sensing means is open circuit.

SUMMARY OF THE INVENTION

Therefore, it is an object of the invention to provide an improved anti-skid brake controlling system for obviating the above conventional drawbacks.

It is another object of the invention to provide a safety device in the anti-skid brake controlling system thereby performing the effective brake operation even when the sensing means is open circuit.

BRIEF DESCRIPTION OF THE DRAWING

Other and further objects, features and advantages of the invention will appear more fully from the following description taken in connection with the accompanying drawing wherein:

FIG. 1 is a schematic circuit diagram of a preferred embodiment of the invention, and FIG. 2 is an emergency circuit applicable for the embodiment of FIG. 1.

DETAILED DESCRIPTION OF THE INVENTION

Referring now to the drawing, numeral 10 designates a senses coil which is connected to one wheel and sensing (not shown) the vehicle rotational conditions of the one wheel.

At the sensing coil 10 is generated an AC wave form (sinusoidal wave form) responsive to the wheel rotational speed. Since the various components of a logic circuit 18, detailed description of which will appear later, are actuated by pulsed signals (square wave forms), the sinusoidal wave form from the sensing coil 10 must be converted to pulses. For this purpose a converter 11 is employed, which comprises a smoothing and amplifying circuit consisting of a plurality of resistors R1 through R5, capacitors C1, C2 and C3 and a transistor T1, and a trigger circuit consisting of a plurality of resistors R6 through R9, and transistors T2, T3.

The sinusoidal wave form output from the sensing coil 10 is amplified by the smoothing and amplifying circuit and the thus amplified output is converted to pulsed output signal by the trigger circuit. Accordingly, the pulsed output signal identified as $a$ is fed to inputs of NAND elements N1 and N6 of the logic circuit 18 from a first output terminel 12 of the converter 11.

On the other hand, a second pulsed output signal which is identified as $b$ is fed from a second output terminal 15 of a detecting circuit 13 to inputs of first inverter IN 1 and the NAND element N1 of the logic circuit 18. This second pulsed output signal $b$ is generated in response to the resistance value of the sensing coil 10 through the detecting circuit 13, the construction and function thereof being as follows. A transistor T4, the base of which is connected to the sensing coil 10 through a resistor R11, is connected at its emitter terminal to a capacitor C4 through a resistor R12, and further to the non-negative input of a first operational amplifier OP1 and the negative input of a second operational amplifier OP2, respectively. The outputs of the first and second operational amplifiers OP1, OP2 are connected to the base of a transistor T5, e.e., the output of the former being through a diode D1, the output of the latter being through a diode D2. The collector terminal of the transistor T5 is connected to a relay coil 14 to energize the same when the transistor T5 is conductive. A relay switch 14a is arranged to be closed when the relay coil 14 is energized. A luminous diode LED1 is arranged to be lighted when the relay switch 14a is closed.

A bias voltage, which is defined according to resistance values of resistors R10, R11, and the sensing coil 10, is applied to the base of the transistor T4 so that a predetermined voltage is charged in the capacitor in proportion to the bias voltage of the transistor T4. A resistor R13 is provided for discharging the voltage of the capacitor C4. Thus, the voltage charged in the capacitor C4 is changed in proportion to the resistance value of the sensing coil 10, i.e., in proportion to a normal, or troubled, condition of the sensing coil 10.

At the negative input of the first operational amplifier OP1 is fed a predetermined voltage input signal being identified as $\alpha$ which is determined higher than the predetermined voltage charged in the capacitor C4, while at the non-negative input of the second operational amplifier OP2 is fed a predetermined voltage input signal being identified as $\beta$ which is determined lower than the predetermined voltage charged in the capacitor C4.

Thus, for example, if the sensing coil 10 is open circuit, the bias voltage of the base of the transistor T4 will be increased, whereby the voltage charged in the capacitor C4 is raised more than the predetermined voltage, and, on the contrary, if the sensing coil 10 is shorted, the bias voltage of the base of the transistor T4 will be decreased whereby the voltage charged in the capacitor C4 is lowered less than the predetermined voltage.

Further, if the charged voltage of the capacitor C4 is over the predetermined input signal $\alpha$ due to an open circuit condition of the sensing coil 10, the output of the output gate of the first operational amplifier OP1 becomes high, thereby turning on the transistor T5. The relay coil 14 is, therefore, energized to close the relay switch 14a, and due to this closing of the switch 14a the luminous diode LED1 is lighted to inform the operator of the vehicle of the defective condition of the system.

If the charged voltage of the capacitor C4 is lower than the predetermined input signal $\beta$ due to a shorted condition of the sensing coil 10, the output of the output gate of the second operational amplifier OP2 becomes high thereby turning on the transistor T5. Accordingly, in this event the relay coil 14 will also be energized to close the relay switch 14a. Due to this closing operation of the switch 14a the luminous diode LED1 is also lighted to inform the operator of the vehicle of the defective condition of the system.

In both of these cases, the output signal b at the second output terminal 15 becomes low due to the closing movement of the switch 14a.

Another wheel of the vehicle, if the wheel described heretofore, is left, then the right wheel, has the same circuits as those of the aforementioned wheel, i.e., another sensing coil, another converter, and another detecting circuit, all of which are illustrated as one circuit block A in FIG. 1. A third output terminal 16 of the circuit block A corresponds to the first output terminal 12 of the converter 11, and therefore, a third output signal identified as c corresponds to the signal in proportion to the rotational speed of the right wheel of the vehicle, while a fourth output terminal 17 of the circuit block A corresponds to the second output terminal 15 of the detecting circuit 13, and therefore, a fourth output signal identified as d corresponds to the signal in response to the resistance value of the sensing coil (not shown) of the right wheel.

The logic circuit 18 for the left and right wheel signals comprises six NAND gates N1 through N6. Gate N1 has as its inputs the signals a and b and its output constitutes one input of output gate N2. Gate N3 has as its inputs the signals c and d and its output constitutes one input gate N4. Thereby is produced a high level output signal at an output NAND gate N2 or N4 when either one of the inputs of the first and second input NAND gates N1 or N3 is low, and producing a low level output signal at the output NAND gate when both of the inputs of the first and second input NAND gates become high. The logic circuit 18 further comprises two inverters IN1 and IN2, each input signal b and d respectively being inverted therethrough and passed as one input respectively to gates N5 and N6. Signals c and a serve respectively as the other inputs to gate N5 and N6. The outputs of gates N5 and N6 consititute the other inputs to gates N2 and N4.

The operation of the system thus described will now be considered under several conditions of vehicle wheel anti-lock operation.

First, both wheels of the vehicle being under normal anti-skid brake operation, the first and third output signals a, c correspond to the respective wheel rotational speeds, while the second and fourth output signals b, d are high. In this circumstance, the second output signal b which is divided into two is, on the one hand, inverted by the first inverter IN1, and therefore the output thereof will change to low and thus one input of the NAND gate N5 becomes low. Accordingly, the output of NAND gate N5 becomes high independently of the state of the other input of NAND gate N5 to which the third output signal c is fed from the third output terminal 16.

The high level second output signal b is fed as one input of NAND gate N1, and to the other input of which is fed the first output signal a, and therefore the output of NAND gate N1 is the inverted signal of the first output signal a. Since the first and second inputs to NAND gate N2 are fed from the outputs of the NAND gates N1 and N5, respectively, the output of NAND gate N2 becomes a signal corresponding to the twice inverted signal of the first output signal a, i.e., the signal a itself.

In a corresponding manner, the high level fourth output signal d is fed, on the one hand, to the second inverter IN2 thereby thus the input of the second input NAND gate N6 being low, to the input of the first input NAND gate N6 being fed the first output signal a. The high level fourth output signal d is, on the other hand fed to the input of the first input NAND gate N3, to the input of the second input NAND gate N3 being fed the third output signal c. Thus, to the input of the first input NAND gate N4 is fed the high level signal, d while to the input of the second input NAND gate N4 is fed the inverted signal of the third output signal c, whereby the output of the output NAND gate N4 becomes the signal of twice inverted output signal c, i.e., the third output signal c itself.

Therefore, under normal anti-skid brake operation, the anti-skid brake actuator is actuated in proportion to the rotational speeds of the corresponding wheels of the vehicle.

Next, when either one of the sensing coils, for example, the sensing coil 10, is shorted, or open circuit under such normal anti-skid brake operation, then the transistor T5 of the detecting circuit 13 will be actuated to close the switch 14a and to light the luminous diode LED 1. Therefore, the second ouput signal b at the second output terminal 15 becomes low. The low level second output signal b is fed, on the one hand, to the input of the first inverter IN1 and, on the other hand, directly to the input of the second input NAND gate N1.

The signal inverted by the first inverter IN1 is fed to the input of the first input NAND gate N5 as a high level input signal, while to the input of the second input NAND gate N5 has been fed the third output signal c, wherein the output of the NAND gate N5 becomes the inverted signal of the third output signal c.

Since the low level signal is fed to the input of the second input NAND gate N1, the output of the output NAND gate N1 becomes high independently of the state of the first input NAND gate N1. Accordingly, the output of the output NAND gate N2 becomes the twice inverted signal of the third output signal c, i.e., the third output signal c itself. At this time if the sensing coil of A is in order, the output of the output NAND gate N4 will correspond to the third output signal c as explained heretofore.

Vice versa, if the sensing coil of A is shorted, or broken down instead of the sensing coil 10, then the fourth output signal d from the fourth output terminal 17 becomes low and similar to the above described manner, both outputs of the output NAND gates N2, N4 correspond to the first output signal a.

In this way, if one of the sensing coils becomes defective, then the signal which is to be generated according to the rotational speed of the corresponding wheel, may be substituted for the signal generated according to the rotational speed of another wheel, and in response to this signal, the conventional anti-skid brake actuator is actuated to maintain the anti-skid brake operation even when one of the sensing coils of the anti-skid brake system should become defective.

Considering the case that both of the sensing coils are shorted or open circuit, an emergency circuit 19 is further provided for stopping the actuation of the anti-skid actuator 30 as is shown in FIG. 2, wherein the second and fourth output signals b and d are connected to the bases of transistors T6 and T7 through suitable resistors and further to transistor T8.

A relay coil 20 is connected to the collector terminal of the transistor T8. A normally closed relay switch 20a is connected to the actuator 30 whereby, the opening movement of the relay switch 20a due to the energization of the relay coil 20 causes the actuation of the actuator 30 to stop. If both sensing coils are shorted, or open circuit, both output signals b and d become low and, accordingly, the transistors T6, T7 and further the transistor T8 are turned ON to energize the relay coil 20 thus thereby to open the relay switch 20a. In this way, the power supply to the actuator 30 is cut off so that normal brake operation, as opposed to anti-skid brake operation, may be performed to prevent at least a no-braked condition of the wheels.

I claim:

1. A signal generating circuit for actuating an anti-skid brake actuator comprising at least a pair of first and second wheel means, said first wheel means comprising a first wheel, and a first sensing means including a first sensing coil sensing rotational conditions of said first wheel and generating a first signal in response thereto, a first detecting circuit electrically connected to said first sensing coil and detecting faulty conditions thereof thereby generating a second signal in response thereto, said second wheel means comprising a second wheel and a second sensing means including a second sensing coil sensing rotational conditions of said second wheel and generating a third signal in response thereto, a second detecting circuit electrically connected to said second sensing coil and detecting faulty conditions thereof thereby generating a fourth signal in response thereto and a logic circuit for receiving said four signals and generating first and second output signals therefrom a first of which corresponds to the first signal of said first sensing coil and second of which corresponds to the third signal of said second sensing coil under normal anti-skid brake operation, whereby upon reception of said second signal in response to a faulty condition of said first sensing coil, said first output signal is entirely substituted for and directly replaced by said third signal of the non-faulty second sensing coil.

2. A signal generating circuit as claimed in claim 1, wherein each of said pair of first and second sensing means further comprises a converter circuit electrically connected to said corresponding sensing coil thereby converting said first signal into pulsed wave form.

3. A signal generating circuit as claimed in claim 2, wherein each detecting circuit comprises first and second operational amplifiers, said first operational amplifiers detecting shorted conditions of the respective sensing coils, and said second operational amplifiers detecting respectively open circuit conditions thereof.

4. A signal generating circuit as claimed in claim 3, wherein each of said detecting circuits further comprises a luminous diode informing the troubled conditons of each sensing coil upon said second or fourth signal being generated.

5. A signal generating circuit as claimed in claim 1 further comprising a cancelling circuit inserted between said first and second wheel means and said logic circuit and receiving said second signals of said first and second wheel means whereby upon reception of said second and fourth signals of said first and second detecting circuits, anti-skid brake operation is substituted by normal brake operation independently of said first and second output signals of said logic circuit.

6. A signal generating circuit as claimed in claim 5, wherein said cancelling circuit is electrically connected to said anti-skid brake actuator thereby controlling the actuation thereof.

7. A signal generating circuit for anti-skid brake system including at least a pair of first and second sensing coils correlated to first and second wheels for sensing rotational conditions of said first and second wheels, respectively, and generating first and second signals in response thereto, wherein upon faulty conditions occuring in either one of said first and second sensing coils, the signal of the other one of said first and second sensing coils is entirely substituted to directly replace the signal of said faulty sensing coil in order to maintain anti-skid brake operation even in the event that one of the sensing coils is faulty.

* * * * *